May 5, 1936.　　　　S. H. NORTON　　　　2,039,976
SEPARABLE FASTENER
Filed Oct. 19, 1931
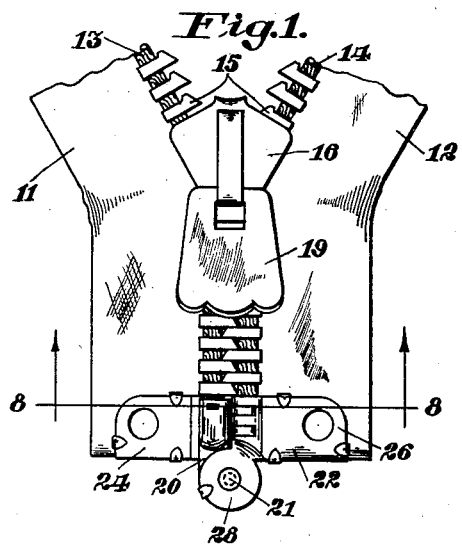
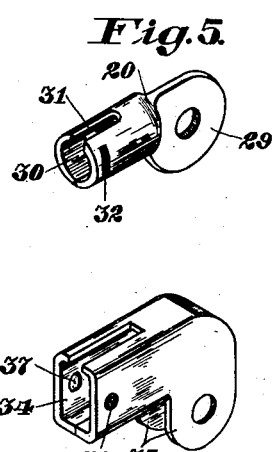
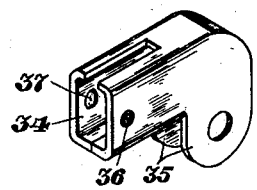
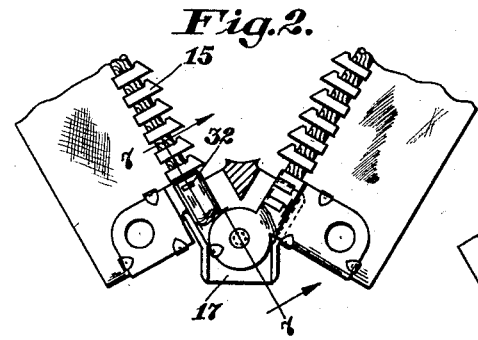
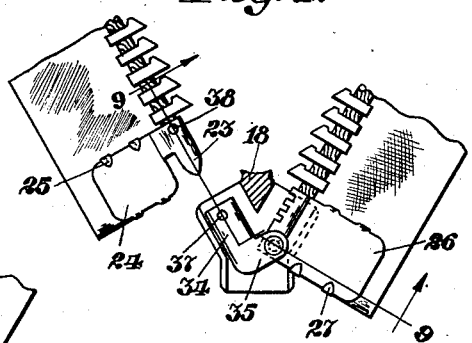
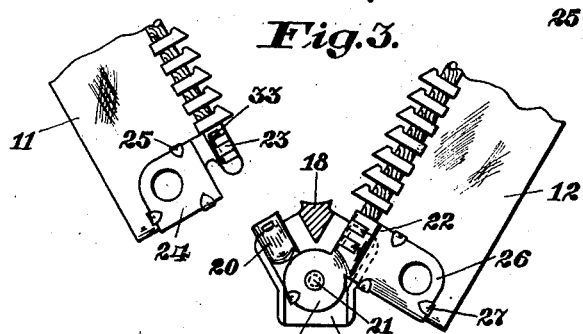
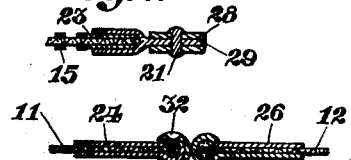
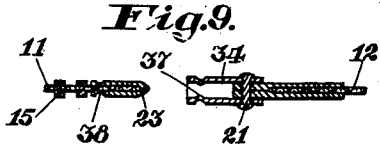
INVENTOR.
Samuel H. Norton
BY
R. S. Kelley
ATTORNEY.

Patented May 5, 1936

2,039,976

UNITED STATES PATENT OFFICE 2,039,976

SEPARABLE FASTENER

Samuel H. Norton, Meadville, Pa., assignor to Hookless Fastener Company, a corporation of Pennsylvania Application October 19, 1931, Serial No. 569,700

2 Claims. (Cl. 24—205)

My invention relates to multiple interlocking fasteners and particularly to a separable end connection for such fasteners.

The invention is herein described in association with a slider operated fastener of the general type disclosed in the Sunback Patent 1,219,881, March 20, 1917.

In the use of fasteners of the above type in coat-like garments and various other articles, it is desirable to have the opposite sides of the fastener separate completely at both ends, and such fasteners are now commercially manufactured in one form which has a permanent end connection and in another form which has a separable end connection.

The principal objects of the present invention are to provide a novel and improved form of separable end connection for fasteners of the type referred to, which will be capable of easy connection and disconnection by unskilled users; which will be cheap to manufacture; which will be exceedingly reliable in service; and to make the whole structure as compact and neat in appearance as possible.

According to the invention, a socket forming member is attached to one stringer at the end of the series of interlocking elements while a pin-like member is mounted on the other stringer for insertion in the socket when the slider is moved against the socket forming members. In order to retain the pin in the socket, a simple form of snap retaining device is provided. A further advantageous feature is the hinge connection of the socket forming part to the end of one stringer whereby the pin element can be inserted into the socket through the slider channel at the proper angle.

Various other advantages and results of the invention will appear during the course of the following specification and the novelty will be pointed out in the appended claims.

In the accompanying drawing I have shown for purposes of illustration one embodiment and a slight variation thereof which my invention may assume in practice. In the drawing:

Fig. 1 is a face view of one end of a slide operated fastener equipped with my improved separable end connection;

Fig. 2 is a view of the same parts in position ready to be separated;

Fig. 3 is another view of the same parts completely separated;

Fig. 4 is a face view showing the reverse side of the parts in the position shown in Fig. 3 with a modified form of pin and socket;

Fig. 5 is a perspective view of the socket forming member of Fig. 1;

Fig. 6 is a perspective view of the modified form of socket forming member shown in Fig. 4;

Fig. 7 is a section view on line 7—7 of Fig. 2;

Fig. 8 is a section view on line 8—8 of Fig. 1; and

Fig. 9 is a section view on line 9—9 of Fig. 4.

The fastener in association with which I have illustrated my invention comprises a pair of flexible stringers 11, 12 having beaded edges 13, 14 respectively, to which are attached the multiple interlocking fastener elements 15. The fastener elements have cooperating recesses and projections which are engaged and disengaged when aligned at suitable angles to each other, by movement of a slider 16 along the fastener from one end to the other. The slider comprises flat metal wing portions 17 connected by a neck 18 at one end and has a pull 19 for convenient actuation along the stringers.

In order to hold together the aligned multiple interlocking elements in the proper position, I provide a separable end connection comprising a socket forming member 20 pivotally connected at 21 to the mounting device or clip 22 which is firmly attached to the stringer 12, and a cooperating pin element 23 firmly attached to the end of the stringer 11. The pin element has extensions 24 engaging over opposite sides of the stringer which are firmly fastened thereto by clinchers 25, and this whole part may be conveniently stamped out of sheet metal and folded into the form shown. The clip 22 is likewise stamped from sheet metal and formed with extensions 26 which are fastened firmly to the tape 12 by clinchers 27. This part carries a hinge extension 28 for connection to the hinge part 29 of the tubular socket member. This socket forming member is also designed to be bent up out of sheet metal and has in the form shown in Fig. 5, a split tubular socket 30 having a slot 31 on one side to allow entrance of the extensions 24 of the pin element 23. The tubular socket 30 is indented at 32 to form an inward projection adapted to snap into a corresponding indentation 33 on the pin element.

In the form shown in Figs. 4, 6 and 9, the socket 34 is of rectangular section which has certain advantages when it is desired to make the construction more rigid because it thus prevents relative turning of the pin in the socket, the pin member being of corresponding form. This form of socket member also has two hinge tabs 35 and is of split form adapted to be readily manufactured from sheet metal. On opposite sides the metal forming the socket is indented at 36, 37 to form small round projections adapted to snap into the round indentations 38 on the pin member as clearly shown in Fig. 9. The sockets 30 and 34 are both closed at their bottom ends as shown in Figs. 7 and 9 respectively.

In assembling the parts the slider is moved against the hinge connection as shown in Fig. 3 in which position the socket forming member extends at an angle through the channel of the slider. The pin element is then readily inserted at the proper angle until it is snapped into position. The snap devices retain the pin in the socket while the slider is pulled up to close the fastener. Of course, the opposite order of procedure is followed out to disengage the parts.

While I have shown and described one embodiment and a variation thereof which my invention may assume in practice, it will be understood that this embodiment is merely for the purposes of illustration and description and that various other forms may be devised within the scope of my invention as defined in the appended claims.

What I claim as my invention is:

1. In a multiple interlocking fastener, a pair of fastener stringers, a separable end connection for said stringers comprising a socket forming member attached to one stringer and providing a longitudinally extending socket closed at its bottom end, a longitudinally extending pin attached to the other stringer, the walls of said socket being split, and cooperating indentations and projections on said pin member and the walls of said socket adapted to snap into engagement and resiliently hold the pin in inserted position.

2. In a multiple operated fastener, a pair of fastener stringers, cooperating series of interlocking members attached to said stringers, a separable end connection for such stringers comprising a socket forming member hinged to one stringer and providing a longitudinally extending socket, a longitudinally extending pin member carried by the other stringer, a slider movable along said stringers for engaging and disengaging said interlocking members, said socket forming member being adapted to move at an angle to the edge of its stringer when the slider is moved against the hinged connection, said pin member being insertable into said socket while the latter is disposed at such angle and cooperating snap retaining means on said pin and socket for yieldingly holding said pin in said socket after insertion.

SAMUEL H. NORTON.